United States Patent Office

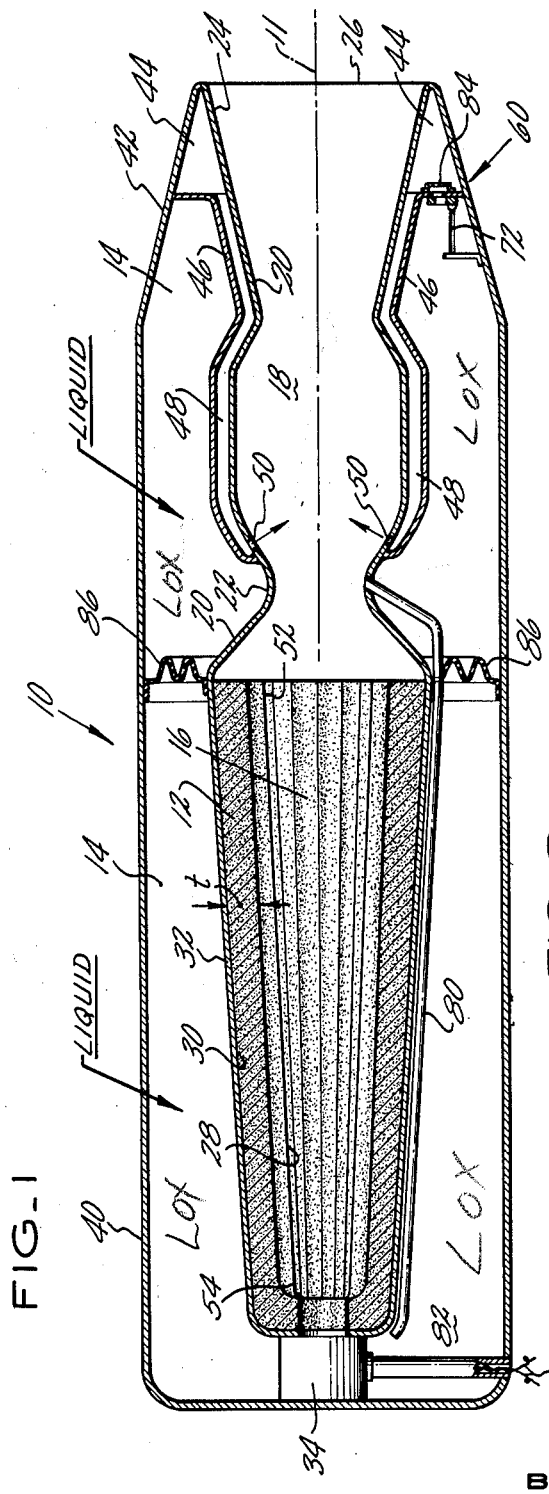

3,132,475
Patented May 12, 1964

3,132,475
HYBRID ROCKET PROPULSION SYSTEM
Philip S. Hopper, Manchester, Conn., assignor to United Aircraft Corporation, East Hartford, Conn., a corporation of Delaware
Filed June 29, 1961, Ser. No. 120,757
10 Claims. (Cl. 60—35.6)

This invention relates to rocket engines and more particularly to the propulsion system of a short term duration hybrid rocket engine such as an air-to-air rocket which will be carried through changes of altitude and hence temperature in its stored condition before firing from another vehicle at altitude.

It is an object of this invention to provide a hybrid rocket engine utilizing a conically shaped grain of solid propellant with a similarly shaped bore and case enveloped within a cylindrical casing which defines an annular liquid oxidizer reservoir therewith.

It is a further object of this invention to teach a hybrid rocket propulsion system wherein rocket thrust may be controlled by varying the rate of propellant combustion.

It is still a further object of this invention to teach such a hybrid rocket propulsion system wherein the rate of liquid oxidizer flow to the rocket afterburner is a function of propellant storage temperature, and more particularly to the temperature of the stored liquid oxidizer.

It is a further object of this invention to teach a hybrid rocket to permit thrust control by varying the rate of liquid oxidizer addition and to also provide a flight vehicle with high specific impulse.

It is still a further object of this invention to teach an afterburning hybrid rocket wherein the liquid oxidizer addition rate into the afterburner is controlled as a function of stored propellant temperature and wherein the flow control mechanism becomes immobile after rocket firing to prevent influence thereon by motion factors such as G-loads imposed by rocket maneuver.

Other objects and advantages will be apparent from the specification and claims and from the accompanying drawings which illustrate an embodiment of the invention.

FIG. 1 is a cross-sectional showing of my hybrid afterburning rocket propulsion system; and FIG. 2 is an enlarged fragmentary view of the thermostatic valve shown in FIG. 1.

Referring to FIG. 1 we see hybrid afterburning rocket 10, which is of generally circular cross section and concentric about axis 11, and which comprises a fuel-rich solid propellant grain 12 enveloped within a liquid oxidizer reservoir 14 and which envelops solid propellant combustion chamber 16. Afterburner chamber 18 is positioned downstream of solid propellant combustion chamber 16 and is connected thereto by ducting 20 which defines throat 22, afterburner chamber 18 and thrust nozzle 24. Propulsion nozzle 24 is positioned downstream of and connected to afterburner chamber 18 by ducting 20 and defines exhaust outlet 26 through which the products of combustion of hybrid rocket 10 are discharged to generate thrust. Grain 12 is made of a fuel-rich solid propellant such as polybutadiene acrylic acid, aluminum powder, ammonium perchlorate or polyurethane, aluminum, ammonium perchlorate and also has substantially constant wall thickness "*t*" at one radial plane and is tapered so as to increase in cross-sectional void area rearwardly along both its inner surface 28 and its outer surface 30. Grain 12 is snuggly received in or cast in tapered case 32 which tightly sleeves over the outer surface 30 of grain 12 after being ignited by ignitor 34 which may be composed of magnesium powder and an oxidizing material and brought to ignition temperature by a resistance element, and which may be electrically pilot ignited through the pilot activation of electrical connection 36, the fuel-rich products of combustion created by the combustion of grain 12 within combustion chamber 16 is discharged rearwardly through throat 22 and into afterburner chamber 18 where liquid oxidizer such as red fuming nitric acid, chlorine trifluoride or bromine tetrafluoride is added to the fuel-rich products of solid propellant combustion to accomplish second step or stage burning within afterburner 18 and then discharged to atmosphere or space through outlet 26 to generate thrust after passing through thrust nozzle 24.

It will be noted that liquid oxidizer reservoir 14 extends for the full axial dimension or length of rocket 10 and envelops not only solid propellant case 32 but also casing 20 which defines throat 22, afterburner cavity 18 and thrust nozzle 24. It will further be noted that reservoir 14 is defined at its outer end by cylindrical case 40, which case tapers smoothly at its after end 42 to smoothly blend with the surfaces of thrust nozzle 24 at outlet 26, thereby minimizing drag.

Liquid oxidizer is provided to afterburner chamber 18 after first being introduced into oxidizer manifold 44 in a fashion to be described hereinafter. Oxidizer manifold 44 is preferably defined between cases 20 and 40 and jacket 46 which extends forwardly from manifold 44 and forms a cooling passage 48 with case 20 through which the liquid oxidizer flows to cool case 20 prior to injection into afterburner chamber 18 through a plurality of circumferentially positioned apertures 50. Apertures 50 may be in the wall of case 20 or may include special nozzles.

The hybrid rocket, by utilizing the combination of a solid propellant as fuel and a liquid oxidizer overcomes inherent disadvantages which are encountered in the solid propellant rocket. In the solid propellant rocket, since the solid propellant rate of combustion cannot be varied, there is no way of controlling the thrust in a solid propellant rocket. Thrust control can be obtained in a hybrid rocket by varying the rate of addition of the liquid oxidizer. Levels of specific impulse for solid propellants are generally lower than for liquid propellants. Specific impulse may be defined as the thrust developed (lbs.) divided by the propellant consumption rate (lbs. per second) which reduces to seconds impulse. For solid propellants the addition of a crystalline oxidizer also generally tends to lower the physical properties of the grain. The majority of the solid propellants with better than average specific impulse tend toward poorer physical properties primarily due to the addition of powdered metal and crystalline oxidizers such as ammonium perchlorate. The strength generally lies in the fuel-binder material such as polyethylene or polybutalene. It will therefore be seen that due to the physical weakening of the grain by the solid crystalline oxidizer and powdered metal it is questionable whether high specific impulse can be obtained without jeopardizing physical properties, particularly at low temperature. Cracking the grain will catastrophically accelerate its burning rate by substantially increasing its burning surface.

Solid propellant rockets present a volume efficiency or packaging problem which my hybrid rocket system overcomes. In solid propellant rockets utilizing grain of cylindrical shape and bore, it has been found that erosion is encountered at the downstream end of the cylindrical bore due to the passage of the heated products of combustion at a high velocity thereover. This erosion problem may be solved by increasing the bore size of the cylindrical grain but this gives greater forward end grain size than is needed and hence is volumetrically inefficient. To alleviate this erosion and hence waste condition, my solid propellant grain 12 is made to have a tapered bore 28 and a corresponding taper in its outer wall 30 such that the downstream end 52 thereof is of greater cross-sectional area than the upstream end 54 thereof. This reduces the velocity of the heated products of combustion across the after end 52 of inner surface 28 and hence eliminates both the erosion and the volumetric efficiency problems, however, it presents a conical or tapered casing 32 for storage purposes. This shape has been considered impractical for many applications such as for air launched missiles because the missiles can not be securely stowed in a fireable condition with stationary equipment. Contrary to this, a rocket with a cylindrical case can be so stowed.

The disadvantages enumerated above caused by conical case 32 are eliminated in my hybrid rocket by enclosing conical case 32 within cylindrical case 40 and utilizing the cavity therebetween as a reservoir for the liquid oxidizer thus utilizing most effectively the volume and indirectly minimizing drag to improve performance.

It is a characteristic of rocket propellants that the burning rate and hence the thrust generated thereby varies with changes in the temperature of the propellant. It is an important teaching of my hybrid rocket propulsion system to overcome this burning rate problem and hence control the rocket thrust by regulating the rate of introduction of the liquid oxidizer into afterburner chamber 18 of a short term duration rocket as a function of temperature of the stored propellant. It should be borne in mind that the flight time on an air-to-air missile is as short as 20 seconds and hence liquid propellant flow control as a function of storage temperature is considered sufficient since flow corrections in flight would not produce significant changes due to the short duration of flight. While it will be obvious to one skilled in the art that by appropriate thermo-couple hookup, the temperature of the solid propellant grain 12 could be detected while in the stored condition and utilized as the control signal, it appears to be more convenient to use the storage temperature of the stored liquid oxidizer, which is virtually the same as the storage temperature of the stored solid propellant since it is in intimate contact therewith, and hence my preferred embodiment illustrates a liquid oxidizer flow control system regulated by the storage temperature of the stored liquid oxidizer. Thermo-static valve 60 is positioned within the liquid oxidizer reservoir 14 and in the after end 42 thereof so that it is controlled by the storage temperature of the liquid oxidizer. Thermo-static valve 60 comprises stationary radially extending plate 62 which may be a part of cooling fuel jacket 46 and which is juxtapositioned, in contact with, and downstream or rearwardly of movable radially extending plate 64. Plates 62 and 64 have apertures 66 and 68 therein which may be of any desired shape but which are radially movable with respect to one another so as to vary the area of orifice 70 which they define, thereby varying the rate of liquid oxidizer flow therethrough. Plate valve 64 is caused to move radially along plate 62 by bimetallic spring element 72 which is immersed within the liquid oxidizer and hence actuated as a function of liquid oxidizer storage temperature. In this fashion, the rate of addition of liquid oxidizer to afterburner chamber 18 is varied as a function of stored propellant temperature, thereby compensating for the variation in propellant combustion rate and hence thrust generation caused by variations in stored propellant temperature.

There may be a plurality of circumferentially positioned thermostatic valves 60 or the valve may be a single annular ring.

The reason that plates 62 and 64 are radially extending and that plate 64 is positioned forward of plate 62 is that once the rocket is fired from the carrying airplane, since no further flow control regulation is needed due to the short operative life of the rocket, it is desirable to immobilize valve 60 to avoid movement of valve plate 64 and hence area variations in orifice 70. The G-loads and liquid oxidizer pressure imposed by the rocket firing will cause plate 64 to bear against plate 62 with sufficient force but it will be impossible for bimetallic element 72 or maneuver loads, or other loads to cause movement of valve plate 64.

The motivated force to cause the liquid oxidizer to flow to thermostatic valve 60, cooling passage 48 and thence into afterburner chamber 18 is conduit or pressure tap 80 which communicates with afterburner chamber 18 or other pressure forces such as combustion chamber 16 and thrust nozzle 24 and bleeds high pressure gas therefrom forwardly for release at the forward end 82 of liquid oxidizer reservoir 14. This pressurized motivating force from conduit 80 causes the liquid oxidizer to flow through thermostatic valve 60, cooling jacket 48 and into afterburner chamber 18. Liquid oxidizer flow out of reservoir 14 prior to firing is prevented by rupturable disc 84 which covers aperture 66 in plate 62 and which is ruptured by the aforementioned pressurization of the liquid oxidizer which also ruptures frangible diaphragm 86 in reservoir 14. Diaphragm 86 performs the function of dividing reservoir 14 into forward and after sections and restrains voids or gas pockets from entering the liquid oxidizer at the after section of reservoir 14, which pockets would impede the flow of liquid oxidizer into afterburner chamber 18 prior to being subjected to acceleration which will force the voids to the forward end and away from the oxidizer feed valve.

*Operation*

Hybrid rocket 10 is caused to operate when an electric charge from source 36 ignites solid propellant igniter 34, which in turn ignites the fuel-rich solid propellant grain 12. The products of combustion of the solid propellant pass into combustion chamber 18 and out of exhaust outlet 26 to cause hybrid rocket 10 to begin to accelerate. This initial acceleration, coupled with the rise in pressure in combustion chamber throat 22 which causes the increased throat pressure to pass through passage 80 to pressurize the liquid propellant within chamber 14, ruptures diaphragms 86 and 84. The aforementioned initial acceleration also causes the valve plate 64 to become stationary with respect to valve plate 62 such that the aligned apertures 68 and 70 are of constant area during the flight. With the diaphragms ruptured the liquid propellant from chamber 14 may pass through valve 60 and through annular cooling chamber 48 from whence it passes through apertures 50 into combustion chamber 18 for combustion therein with the products of combustion of the fuel-rich solid propellant grain 12, which products of combustion are also fuel-rich so as to burn with the liquid oxidizer injected through apertures 50. The products of combustion of the liquid propellant and the fuel-rich products of combustions of the solid propellant are discharged to atmosphere through exhaust outlet 26 to generate thrust.

It is to be understood that the invention is not limited to the specific embodiment herein illustrated and descriped but may be used in other ways without departure from its spirit as defined by the following claims.

I claim:

1. A hybrid rocket having a solid propellant grain of substantially constant wall thickness and having a tapered central bore increasing in cross-sectional area rearwardly, a tapered case containing and supporting said grain, and a substantially cylindrical case enveloping and spaced from said tapered case and cooperating therewith to form a liquid oxidizer reservoir therebetween, an afterburner chamber in communication with said solid propellant central bore and said liquid oxidizer reservoir, a supply of liquid oxidizer in said reservoir, and means responsive to afterburner chamber pressure and to storage propellant temperature to establish a metered flow of said liquid propellant to said afterburner chamber.

2. A hybrid rocket concentric about an axis and having a solid propellant grain of circular cross section and substantially consant wall thickness and having a tapered central bore increasing in cross-sectional area rearwardly, a tapered case snugly enveloping and supporting said grain, and a substantially cylindrical case eneveloping and concentrically spaced from said tapered case and cooperating therewith to form a liquid oxidizer reservoir therebetween, an afterburner chamber in communication with said solid propellant central bore and said liquid oxidizer reservoir, a supply of liquid oxidizer in said reservoir, and means responsive to afterburner chamber pressure and to storage propellant temperature to establish a metered flow of said liquid propellant to said afterburner chamber.

3. In a hybrid rocket concentric about an axis, a fuel rich solid propellant grain of circular cross-section and substantially constant wall thickness and having a tapered central bore increasing in cross-sectional area rearwardly and defining a solid propellant combustion chamber therewithin, a tapered case snugly enveloping and supporting said grain, a substantially cylindrical case enveloping and concentrically spaced from said tapered case and cooperating therewith to form a liquid oxidizer reservoir therebetween, an afterburner chamber positioned rearward of said solid propellant combustion chamber and connected thereto to receive the products of combustion therefrom and culminating in a thrust nozzle, conduit means connecting said reservoir to said afterburner chamber through which liquid oxidizer is supplied to said afterburner chamber, a variable area orifice located in said conduit means and regulating flow therethrough, and means responsive to propellant storage temperature connected to vary the area of said orifice.

4. In a hybrid rocket concentric about an axis, a fuel rich solid propellant grain of circular cross section and substantially constant wall thickness and having a tapered central bore increasing in cross-sectional area rearwardly and defining a solid propellant combustion chamber therewithin, a tapered case snugly enveloping and supporting said grain, an afterburner chamber positioned rearward of said solid propellant combustion chamber and connected thereto to receive the products of combustion therefrom and culminating in a thrust nozzle, a substantially cylindrical case enveloping and concentrically spaced from said tapered case, said afterburner chamber and said thrust nozzle and cooperating therewith to form a liquid oxidizer reservoir therebetween, a shield within said reservoir enveloping said thrust nozzle and said afterburner chamber to define an annular cooling passage therewith and communicating with said afterburner chamber, means connecting said reservoir to said cooling passage so that oxidizer may be supplied to said afterburner chamber, a variable area orifice located in said connecting means and regulating flow therethrough, and means responsive to liquid oxidizer storage temperature connected to vary the area of said orifice.

5. Apparatus according to claim 4 wherein said orifice is located at the rearward end of said reservoir and includes radially extending juxtapositioned plates with alignable holes therein to vary the flow area therethrough, and wherein said plates will become immobile due to G-loading after rocket firing.

6. Apparatus according to claim 5 wherein said plates are caused to move radially with respect to one another to vary the area of said orifice by force imparted thereto by a bi-metallic element located in said reservoir.

7. Apparatus according to claim 4 wherein a frangible diaphragm separates said reservoir into forward and after sections to insure that no gas pockets form in said liquid oxidizer in said after section.

8. Apparatus according to claim 4 and including conduit means connecting one of said chambers to the forward end of said reservoir to provide an actuating force to force said liquid oxidizer into said afterburner chamber as a function of chamber pressure.

9. Apparatus according to claim 8 wherein a frangible gasket extends across said connecting means to prevent liquid oxidizer flow into said cooling passage until ruptured by the pressure imparted to said liquid oxidizer by said actuating force.

10. In a hybrid rocket, a solid propellant section containing a solid propellant and a solid propellant combustion chamber, an afterburner chamber positioned rearward of said solid propellant section and connected thereto to receive the products of combustion therefrom and culminating in a thrust nozzle, casing enveloping said solid propellant section and defining a liquid oxidizer reservoir therewith, conduit means connecting said reservoid to said afterburner chamber through which liquid oxidizer is supplied to said afterburner chamber, a variable area orifice located in said conduit means and regulating flow therethrough, valve means responsive to propellant storage temperature connected to vary the area of said orifice, said valve means including two sliding plates which become immobile due to G-loading during rocket flight.

References Cited in the file of this patent

UNITED STATES PATENTS

| | | |
|---|---|---|
| 2,612,747 | Skinner | Oct. 7, 1952 |
| 2,671,312 | Roy | Mar. 9, 1954 |
| 2,829,492 | Kleinman | Apr. 8, 1958 |
| 2,955,649 | Hoffman et al. | Oct. 11, 1960 |
| 2,972,225 | Cumming et al. | Feb. 21, 1961 |
| 2,984,973 | Stegelman | May 23, 1961 |
| 2,996,880 | Greiner | Aug. 22, 1961 |
| 3,017,748 | Burnside | Jan. 23, 1962 |
| 3,034,583 | Best | May 15, 1962 |

FOREIGN PATENTS

| | | |
|---|---|---|
| 158,405 | Austria | Apr. 10, 1940 |
| 166,258 | Great Britain | July 11, 1921 |
| 824,752 | Great Britain | Dec. 2, 1959 |